US008597013B2

(12) United States Patent
Strebel et al.

(10) Patent No.: US 8,597,013 B2
(45) Date of Patent: Dec. 3, 2013

(54) TENSIONING RAIL FOR A MEMBRANE OF A MEMBRANE PRESS

(75) Inventors: Beat Strebel, Rodersdorf (CH); Roland Kappaun, Uhldingen-Mühihofen (DE); Roman Polo, Bern (CH)

(73) Assignee: 3S Swiss Solar Systems AG (CH)

( * ) Notice: Subject to any disclaimer, the term of this patent is extended or adjusted under 35 U.S.C. 154(b) by 600 days.

(21) Appl. No.: 12/357,617

(22) Filed: Jan. 22, 2009

(65) Prior Publication Data

US 2009/0324768 A1 Dec. 31, 2009

(30) Foreign Application Priority Data

Jan. 23, 2008 (AT) .................................... A 95/2008

(51) Int. Cl.
*B32B 37/10* (2006.01)

(52) U.S. Cl.
USPC ..... 425/383; 425/388; 425/397; 425/DIG. 48

(58) Field of Classification Search
USPC ........................... 425/383, 388, 397, DIG. 48
See application file for complete search history.

(56) References Cited

U.S. PATENT DOCUMENTS

| | | | | |
|---|---|---|---|---|
| 2,245,961 | A | 6/1941 | Clay | |
| 3,051,217 | A * | 8/1962 | Hill et al. | 72/302 |
| 3,240,412 | A * | 3/1966 | Zygan et al. | 226/88 |
| 3,456,808 | A * | 7/1969 | Bridenstine | 211/134 |
| 3,602,511 | A * | 8/1971 | Gehmann | 273/406 |
| 5,737,812 | A * | 4/1998 | Breil et al. | 26/89 |
| 6,048,190 | A | 4/2000 | Hurley et al. | |
| 6,328,548 | B1 * | 12/2001 | Salas et al. | 425/111 |
| 2007/0000826 | A1 | 1/2007 | Stevens | |
| 2011/0146916 | A1 * | 6/2011 | Zahnd et al. | 156/538 |

FOREIGN PATENT DOCUMENTS

| | | | | |
|---|---|---|---|---|
| DE | 3710949 | A1 | 10/1988 | |
| DE | 102005031416 | | 1/2007 | |
| FR | 2897297 | A1 | 8/2007 | |
| WO | 9115351 | A1 | 10/1991 | |
| WO | 2006/128699 | | 12/2006 | |
| WO | WO 2006128699 | A2 * | 12/2006 | B23B 37/10 |
| WO | 2007093738 | A2 | 8/2007 | |

OTHER PUBLICATIONS

Office Action corresponding to priority Austrian Appln. No. A 95/2008, dated Sep. 18, 2009, 3 pgs.

* cited by examiner

*Primary Examiner* — Amjad Abraham
(74) *Attorney, Agent, or Firm* — Lerner, David, Littenberg, Krumholz & Mentlik, LLP

(57) ABSTRACT

The invention describes a tensioning rail (3) for a membrane (2) of a membrane press. To allow a simpler and more rapid assembly and disassembly of the membrane (2) than in known devices, the tensioning rail includes a support rail (8), in which at least one tensioning strip (13) is mounted detachably, whereby the tensioning strip (13) is designed for securely clamping onto the edge of the membrane (2). In this way it is possible to equip a new replacement membrane (2) with tensioning strips (13) independently and outside of the membrane press, which then only need to be attached to the support rail (8). In this case the support rail does not need to be disassembled, but remains on the membrane press the whole time. A further essential advantage is that the tensioning rail (3) can also be installed into existing membrane presses, for example as a replacement for an existing securing device for the membrane.

12 Claims, 2 Drawing Sheets

TENSIONING RAIL FOR A MEMBRANE OF A MEMBRANE PRESS

Figure 1:
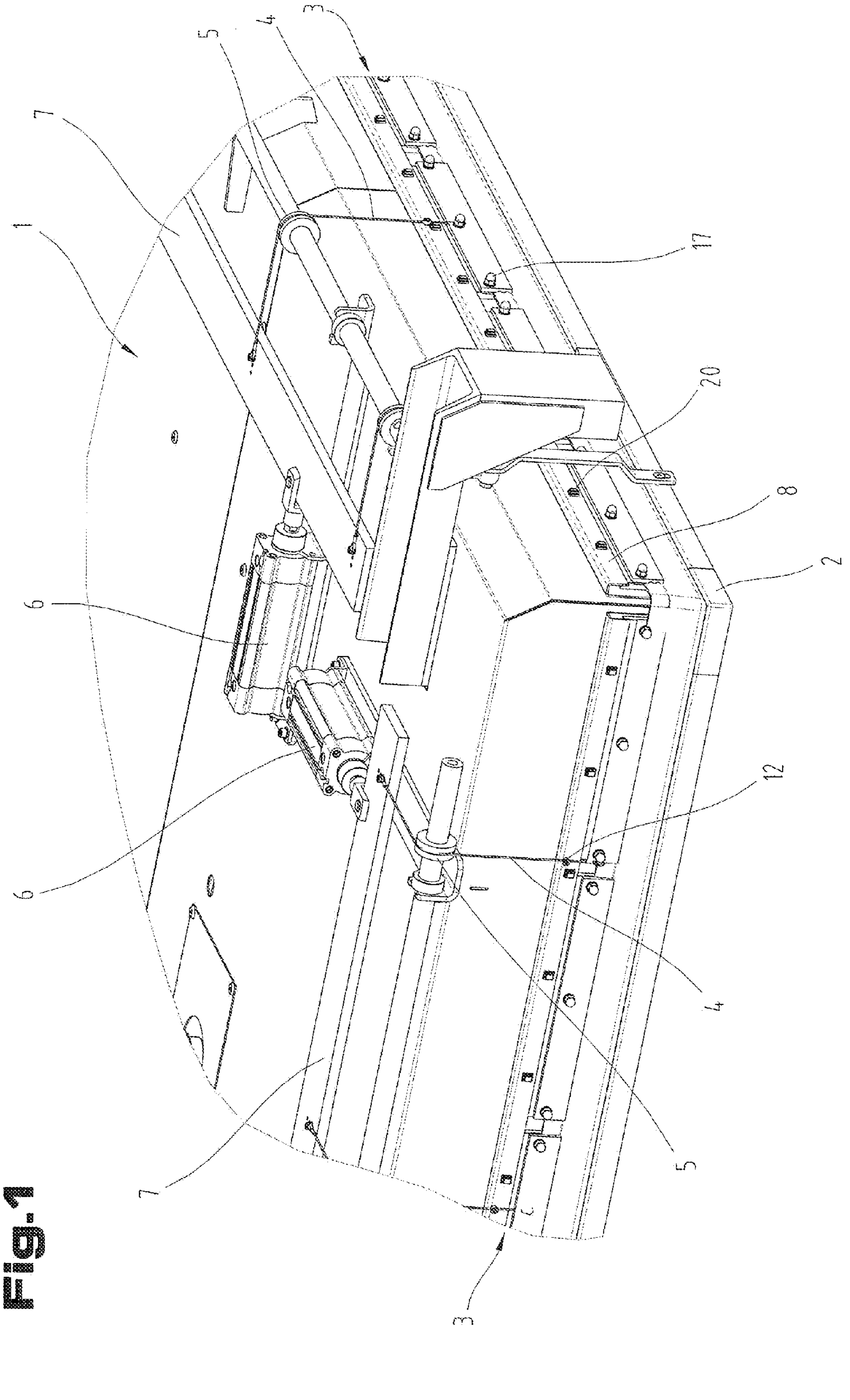

The invention relates to a tensioning rail for a membrane of a membrane press.

To achieve optimal results with membrane presses it is very important to ensure that the membrane, which pressurises the components to be compressed, is stretched out without any folds. Devices for tensioning the membrane are known from the prior art. Thus for example patent application WO 2006/128699 shows a so-called laminating press with means for tensioning the membrane. The membrane is held in this case at its edges by clamping devices, which are connected in turn by pulling means to tensioning drives. The disadvantage of such clamping devices is the assembly and disassembly of the membrane, as in each case a number of screws need to be tightened or loosened. In addition, during the assembly of the membrane its edge has to be held securely until the screws of the clamping device have been tightened sufficiently. Therefore, generally more than one person is required to assemble the membrane.

Patent DE 10 2005 031416 B4 describes a membrane press with a device for tensioning the membrane with a support frame and holding elements, in which the membrane can be secured without the use of tools. The holding elements are claw-like in this case with two clamping faces and a clamping bolt. Alternatively, the holding elements are designed to be buckle-like in the form of a belt buckle, a clamping lock, a spring clamp or a sliding bar lock. If the membrane is tensioned in one plane, is turned at the edges and the tensioning force acts perpendicular to the said plane at the edges, during the assembly of the membrane its edge has to be secured until the holding elements clamp the membrane sufficiently. Also this procedure cannot be performed by one person, not least because the holding elements have to be held whilst tensioning the membrane.

Based on this prior art the underlying objective of the invention is to propose a tensioning rail, by means of which the assembly and disassembly of the membrane can be performed more simply and rapidly than in the devices known from the prior art.

This objective is achieved according to the invention in that the tensioning rail contains a support rail, in which at least one tensioning strip is mounted detachably, whereby the tensioning strip is designed for clamping securely to the edge of the membrane.

This solution according to the invention has the particular advantage that a new replacement membrane can be equipped independently and outside the membrane press with tensioning strips, which then only need to be inserted into the support rail. In this case the support rail does not need to be removed but remains on the membrane press the whole time. A further essential advantage of the tensioning rail according to the invention is that it can also be installed into existing membrane presses, for example as a replacement for an existing securing device for the membrane.

According to one embodiment the cross section of the support rail has the form of a C. Such a shape is simple and inexpensive to manufacture and allows in a particularly simple manner the insertion and removal of the tensioning strip.

Preferably, the C-shape of the support rail has a straight back section and a first leg aligned parallel to the back section and a second leg aligned parallel to the back section. This allows an advantageous and space-saving arrangement of the support rail on a membrane press.

According to a further embodiment the tensioning strip comprises a holding strip in the form of a flat profile, which in the region of a first longitudinal edge bears on the inside of the first leg of the support rail and with a groove provided in the opposite longitudinal edge rests on the second leg of the support rail. In this way the tensioning strip can be inserted very easily into the support rail, in that firstly the first longitudinal edge of the holding strip is pushed behind the first leg of the support rail and then the second longitudinal edge with the groove formed therein is placed onto the second leg of the support rail.

So that the tensioning strip can be displaced easily in the support rail as necessary, it is advantageous if in the groove and/or on the second leg a lining is provided for reducing the friction.

In order to connect the membrane simply with the tensioning strip, according to one embodiment a clamping strip is provided, which can be pressed against the holding strip in order to clamp the membrane securely between the holding strip and the clamping strip. Preferably, at least one screw is provided in order to press the holding strip and the clamping strip against one another.

If according to another embodiment in the holding strip and/or in the clamping strip means are provided for locally turning and/or compressing the membrane, the holding force can be improved in this way.

According to a further embodiment the means for locally turning and/or compressing the membrane comprise at least one longitudinal recess provided in the holding strip and/or in the clamping strip, whereby a profile is inserted into at least one of the recesses. In this way the membrane is turned and the resistance to tearing in increased.

The invention also relates to a membrane press for pressing components with a lower part on which the components are to be placed and an upper part with a membrane, whereby the upper part and the lower part can be moved relative to one another from an open position for inserting and removing the components into a closed position in which a tightly sealed, evacuable chamber is formed between the membrane and the lower part, and whereby on the upper part a tensioning device with a tensioning drive is arranged for tensioning the membrane.

As the membranes of such presses are mostly rectangular and/or have such a configuration that their elasticity is not the same in all directions, with known membrane presses with a tensioning frame or a tensioning drive that is only effective in one direction varying tensions are created in the longitudinal direction of the membrane and in a direction perpendicular thereto.

Therefore, a further objective of the invention is to propose a membrane press, in which the membrane can be tensioned by the tensioning device so that the tension in the membrane is equal in all directions.

This objective is achieved according to the invention in that at least two independent tensioning drives are provided for tensioning the membrane in its longitudinal direction and in its transverse direction.

This solution according to the invention has the advantage that the movements when tensioning the membrane in its longitudinal direction and at right angles thereto can be adjusted differently independently of one another and thus the pulling tensions existing in the membrane after tensioning can be adjusted evenly in all directions.

According to one embodiment the tensioning device comprises pulling elements, which connect the tensioning drives with the edges of the membrane. This allows the arrangement of the tensioning drives on almost any parts of the upper part.

According to a further embodiment, the tensioning drives are arranged on the upper side of the upper part and the pulling elements are turned by deflecting means. This arrangement is economical with space and the tensioning drives remain easily accessible.

According to a particularly preferred embodiment the membrane press is equipped with tensioning rails according to one of claims 1 to 9.

For a better understanding of the invention the latter is explained in more detail with reference to the following figures.

Figure 2:
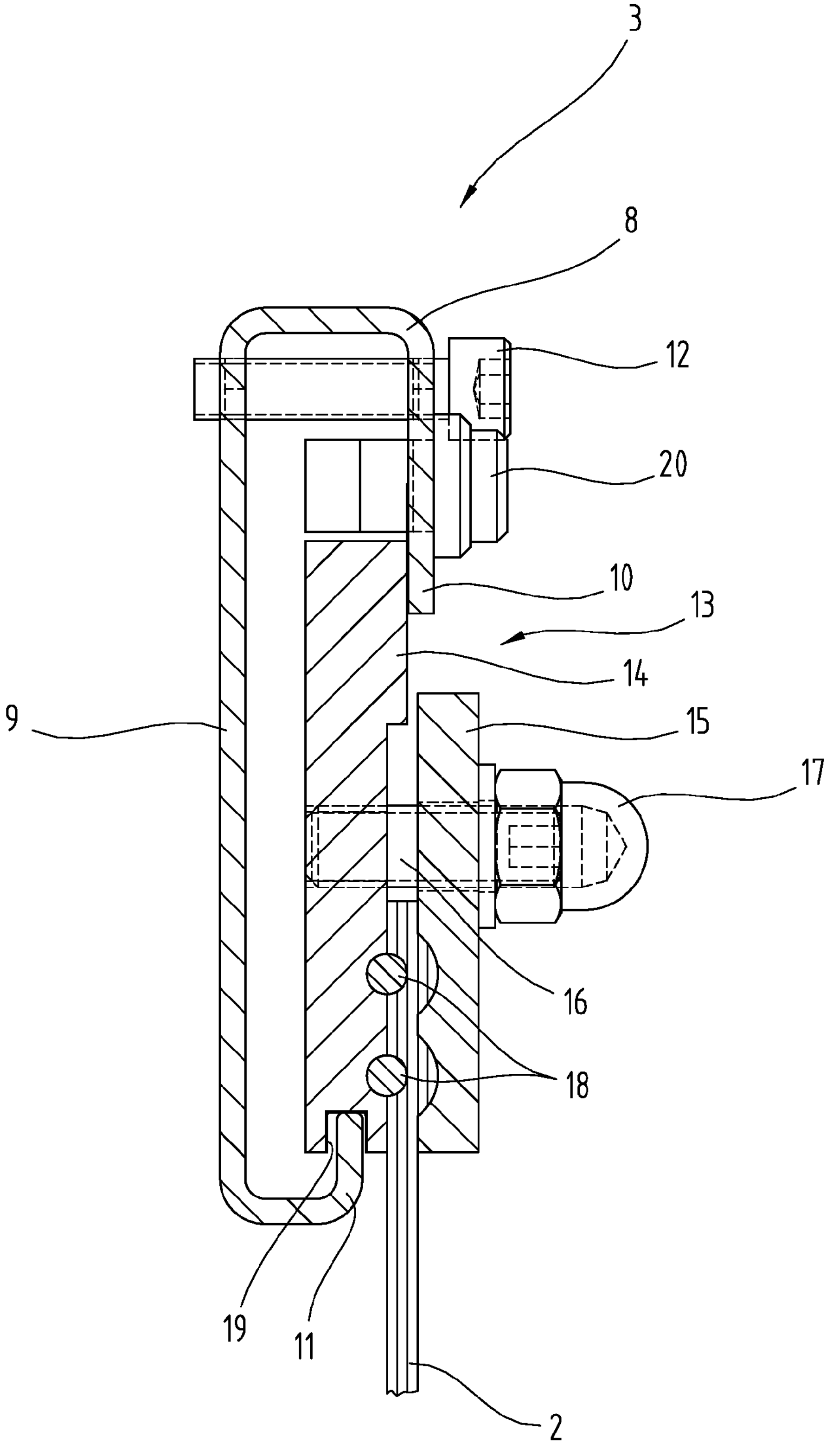

In a much simplified representation:

FIG. 1 shows a view of an upper part of a membrane press in perspective view with tensioning strips and tensioning drive, and FIG. 2 shows a cross section of a tensioning strip.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent and inventive solutions.

FIG. 1 shows in a perspective view a section of an upper part 1 of a membrane press. The upper part 1 is constructed in the form of a box that is open at the bottom and supports on its lower side a membrane 2 made from a flexible, elastic material, for example silicon or a similar material. The upper part 1 is adjustable by means of a not shown lifting drive relative to a not shown lower part of the membrane press. The membrane 2 is designed to form a sealed chamber in the lowered position of the upper part with the lower part, in which parts to be pressed are mounted. In the lower part in addition a heating plate can be provided for heating the said parts. By evacuating the said chamber the membrane exerts pressure on the parts to be pressed. The parts may for example be photovoltaic elements and glass plate-containing layered bodies, which are laminated by the membrane press.

The result of the lamination depends heavily on the fact that the membrane needs to lie on the parts to be pressed without including any folds. In addition, with a lifted upper part 1 the membrane should not be too slack, because otherwise it would obstruct the insertion and removal of parts. For this reason, the upper part 1 is equipped with a tensioning device for the membrane 2. The edges of the membrane 2 are turned upwards on each side of the usually rectangular upper part 1 and the tensioning device comprises on each edge of the membrane 2 a tensioning rail 3, the configuration of which is described in more detail in the following. Each tensioning rail is connected to at least one pulling element 4, for example a rope, which is guided on the top of the upper part 1 over a deflecting roller 5. On the top of the upper part 1 tensioning drives 6 are arranged, which for example can be in the form of hydraulic or pneumatic piston-cylinder-units or spindle drives. Between the tensioning drives 6 and the ropes 4 force transmission bars 7 can be provided.

The membrane is subject to wear and has to be replaced periodically, whereby to improve productivity the effort and time involved are kept to a minimum. In the case of the tensioning devices known from the prior art, in which the membrane is connected to a tensioning frame by holding elements, to disassemble the membrane each holding element has to be detached individually from the edge of the membrane before the membrane can be removed from the membrane press. The new membrane then also has to be reconnected to each holding element, whereby for this purpose a section of an edge of the membrane has to be lifted and inserted into the holding element. This operation takes a relatively large amount of time and cannot be accomplished by one person.

FIG. 2 shows on a much larger scale than FIG. 1 a cross section of an exemplary embodiment of a tensioning rail 3 according to the invention. This comprises an approximately C-shaped support rail 8 with a straight back section 9 and two opposite legs 10 and 11 parallel to the back section 9. Leg 10 is in this case longer than leg 11 and is arranged at a greater distance from the back section 9 than leg 11. A screw 12 is provided for securing the tensioning element 4. In a support rail 8 of the tensioning rail 3 a tensioning strip 13 is used so that it can be removed without the use of tools. The tensioning strip 13 comprises in turn a holding strip 14 and a clamping strip 15, which mount the membrane 2 between them. On the holding strip 14 a threaded bolt 16 is arranged, which makes it possible, by means of a nut, for example a cap nut 17, to clamp the clamping strip 15 against the holding strip 14. This device for clamping the membrane is only mentioned as an example and numerous other options are possible for tensioning the membrane. Thus for example the threaded bolt 16 can have a longitudinal slot and instead of the cap nut 17 a wedge can be provided which is driven into said longitudinal slot. Also devices are possible for tensioning the membrane which can be operated without the use of tools, for example instead of cap nuts, wing nuts, rotary heads or rotary levers can be used or clamping mechanisms can be provided, which are based on the principle of a bayonet lock or eccentric movement. To improve the hold of the membrane 2 in the tensioning strip 13, the holding strip is provided with longitudinal depressions, in which insertion profiles 18 are mounted. The clamping strip 15 also comprises in the region of the insertion profile 18 longitudinal depressions so that the membrane 2 is bent several times on clamping, whereby the frictional force and thus the resistance to tearing is much increased. Instead of insertion profiles 18 also corresponding raised sections can be provided directly on the holding strip 14 or the relevant sections of the holding strip 14 and/or the clamping strip 15 can be designed to be tooth-like.

On the lower side of the holding strip 14 a longitudinally running bolt 19 is attached, which with a tensioning strip 13 inserted into the support rail 8 sits on the leg 11 of the support rail 8. So that the tensioning strip 13 on tensioning the membrane 2 can be easily displaced as necessary along the support rail 8, the groove 19 and/or the relevant area of the leg 11 is preferably provided with a friction-reducing layer, for example with a film made of polytetra-fluoroethylene or a similar material. In order to separate the tensioning strip 13 from the support rail 8 the tensioning strip 13 only needs to be raised slightly and its lower end moved out of the support rail 8. To prevent the unwanted separation of the tensioning strip 13 from the support rail 8, twist-in plugs 20 are provided, which are inserted into openings of the upper leg 10 of the support rail 8 and prevent the lifting of the tensioning strip 13. The twist-in plugs 20 have a non-rounded end and also the openings are not round. When the twist-in plugs after insertion into the openings are rotated by for example 90°, they cannot fall out of the openings. The lifting of the tensioning strip 13 can however also be prevented by other means, for example by screws, bolts or a profiled rod, which is inserted above the holding strip 14 into the support rail 8.

The replacement of a membrane of a membrane press proceeds as follows. Firstly a new membrane 2 is provided with tensioning strips 13 on its edges outside the machine. The latter are preferably stored in various lengths and are attached as necessary, in particular depending on the material, the thickness and the surface of the membrane 2, at intervals or without any gaps onto the edges of the membrane 2. During this preparatory step the membrane press can still be operated. Then in the membrane press a tensioning and sealing frame provided underneath the membrane 2 is loosened and the tensioning drives 6 are moved out such that the membrane 2 becomes loose. Once the twist-in plugs 20 in the support rails 8 have been removed, the membrane 2 to be replaced can be detached, in that the tensioning strips 13 that are securely clamped at their edges are moved out of the support rail 8, similar to the sliding doors of a glass cabinet. Then the upper part 1 is lifted and the membrane 2 to be replaced is removed from the membrane press. Afterwards the prepared new membrane 2 is inserted into the membrane press. The tensioning strips 13 previously clamped onto the new membrane 2 are inserted into the support rail 8 at the top and with the groove 19 are placed onto the leg 11 of the support rail 8. After the insertion of the twist-in plugs 20 into the support rail 8 the new membrane 2 can be tensioned by the tensioning drives 6. Now the upper part 1 can still be placed onto a possibly provided clamping and sealing frame and the latter can be inserted onto the upper part 1. The membrane press is then ready for production again.

The main advantages of the tensioning device according to the invention are that the replacement of the membrane is made simpler and faster and that the tensioning device can also be installed into existing membrane presses and can replace the existing tensioning system. The working surfaces of most membrane presses are rectangular and thus have a greater length than width. As a result the tensioning distance required to achieve a uniform tensioning over the entire surface of the membrane in longitudinal direction is greater than at right angles thereto. Compared to known tensioning devices with a tensioning frame the tensioning device according to the invention has the additional advantage that due to the tensioning rails provided independently on the longitudinal side and the width side of the upper part the tension of the membrane can be established and adjusted in both directions independently.

The exemplary embodiments show possible embodiment variants of the tensioning rail, whereby it should be noted at this point that the invention is not restricted to the embodiment variants shown in particular, but rather various different combinations of the individual embodiment variants are possible, and this variability based on the technical teaching of the present invention lies within the ability of a person skilled in the art in this technical field. Thus all conceivable embodiment variants, which are made possible by combining individual details of the embodiment variant shown and described, are also covered by the scope of protection.

As a point of formality, it should be noted finally that for a better understanding of the structure of the tensioning rail and the membrane press the latter and its components have not been represented to scale in part and/or have been enlarged and/or reduced in size.

LIST OF REFERENCE NUMERALS

1 upper part
2 membrane
3 tensioning rail
4 pulling element
5 deflecting roller
6 tensioning drive
7 force transmission bar
8 support rail
9 back section
10 leg
11 leg
12 screw
13 tensioning strip
14 holding strip
15 clamping strip
16 threaded bolt
17 cap nut
18 insert profile
19 groove
20 twist-in plug

The invention claimed is:

1. A tensioning rail for a membrane of a membrane press, the tensioning rail comprises a support rail, in which at least one tensioning strip is mounted detachably, whereby the tensioning strip is configured for clamping securely to the edge of the membrane; wherein the cross section of the support rail has a C-shape, and wherein the C-shape of the support rail has a straight back section which is parallel to the membrane and a first leg aligned parallel to the back section and a second leg aligned parallel to the back section, and wherein the tensioning strip comprises a holding strip in the form of a flat profile, which in the region of a first longitudinal edge bears with a front surface against the inside of the first leg of the support rail and with a groove provided in the opposite longitudinal edge rests on the second leg of the support rail.

2. The tensioning rail according to claim 1, further comprising a lining for reducing the friction disposed in at least one of the groove and the second leg.

3. The tensioning rail according to claim 2, further comprising a clamping strip pressed against the holding strip in order to clamp the membrane between the holding strip and the clamping strip.

4. The tensioning rail according to claim 3, further comprising at least one screw to press the holding strip and the clamping strip—against one another.

5. The tensioning rail according to claim 1, wherein the longitudinal recess comprises plurality of longitudinal recesses the profile comprises a plurality of profiles disposed within respective longitudinal recesses.

6. The tensioning rail according to claim 4, wherein the clamping strip defines a second longitudinal recess corresponding to the longitudinal recess defined by the holding strip.

7. A tensioning rail for a membrane of a membrane press, comprising:

a support rail having a substantially C-shaped cross section, the C-shape having a substantially straight back section, a first leg aligned substantially parallel to the back section, and a second leg aligned substantially parallel to the back section;

a tensioning strip detachably mounted at least partially within the support rail configured for clamping to an edge of the membrane such that the membrane is substantially parallel with the to the back section, the tensioning strip comprising:

a holding strip having a flat profile, a first longitudinal edge, and a second longitudinal edge opposite the first longitudinal edge, the first longitudinal edge bearing against an inside of the first leg of the support rail;

a groove defined by the second longitudinal edge configured to receive the second leg of the support rail;

a longitudinal recess defined by the holding strip; and a profile disposed within the longitudinal recess.

8. The tensioning rail of claim 7, further comprising a lining for reducing the friction disposed in at least one of the groove and the second leg.

9. The tensioning rail of claim 8, further comprising a clamping strip pressed against the holding strip in order to clamp the membrane between the holding strip and the clamping strip.

10. The tensioning rail of claim 9, further comprising at least one screw to press the holding strip and the clamping strip against one another.

11. The tensioning rail of claim 7, wherein the longitudinal recess comprises plurality of longitudinal recesses the profile comprises a plurality of profiles disposed within respective longitudinal recesses.

12. The tensioning rail according to claim 9, wherein the clamping strip defines a second longitudinal recess corresponding to the longitudinal recess defined by the holding strip.

* * * * *

UNITED STATES PATENT AND TRADEMARK OFFICE

CERTIFICATE OF CORRECTION

PATENT NO. : 8,597,013 B2
APPLICATION NO. : 12/357617
DATED : December 3, 2013
INVENTOR(S) : Beat Strebel et al.

It is certified that error appears in the above-identified patent and that said Letters Patent is hereby corrected as shown below:

In The Claims

Column 6, line 41, delete "—".
Column 6, line 43, after "comprises" insert --a--.
Column 6, line 44, after "recesses" insert --and--.
Column 6, line 46, delete "4" and insert therefor --3--.
Column 6, line 60, delete "to the".
Column 7, line 14, after "comprises" insert --a--; after "recesses" insert --and--.

Signed and Sealed this
Twenty-ninth Day of December, 2015

Michelle K. Lee
*Director of the United States Patent and Trademark Office*

UNITED STATES PATENT AND TRADEMARK OFFICE

CERTIFICATE OF CORRECTION

PATENT NO. : 8,597,013 B2
APPLICATION NO. : 12/357617
DATED : December 3, 2013
INVENTOR(S) : Beat Strebel et al.

It is certified that error appears in the above-identified patent and that said Letters Patent is hereby corrected as shown below:

On the Title of the patent (75), delete “Mühihofen” and insert therefor --Mühlhofen--.

Signed and Sealed this
Twenty-ninth Day of March, 2016

Michelle K. Lee

Michelle K. Lee
*Director of the United States Patent and Trademark Office*